United States Patent Office 2,945,008
Patented July 12, 1960

2,945,008

CONDENSATION POLYMERS DERIVED FROM SPIROGLYCOLS

John R. Caldwell, Russell Gilkey, and Benjamin S. Meeks, Jr., Kingsport, Tenn., assignors to Eastman Kodak Company, Rochester, N.Y., a corporation of New Jersey No Drawing. Filed Aug. 23, 1956, Ser. No. 605,714

16 Claims. (Cl. 260—75)

This invention relates primarily to high melting linear highly polymeric condensation polymers containing recurring units having the following formula:

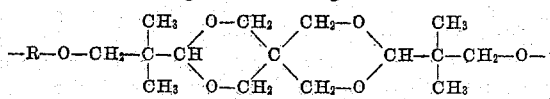

wherein R represents the non-functional residue of a bifunctional organic compound selected from the group consisting of isocyanate compounds and carboxy compounds. In particular, this invention includes linear polyesters and polyurethanes which have melting points of about 200° C. or higher and which can be employed in the manufacture of synthetic fibers useful in the preparation of synthetic fabrics and film useful as a packaging material or as a support for photographic emulsions of either the color or black-and-white type. Other condensation polymers included within the invention are useful as coating compositions, molding compositions, electrical insulation, extrudable compositions for sheets, tubes, etc.

The prior art has described polymers which include spiro linkages in the polymer chain but none of the polymers described employ a spiro-glycol which contains in its structure gem-dialkyl carbon atoms in β-relationship to each of the glycolic oxygen atoms.

We have now discovered that the above-described spiroglycols have an unexpectedly favorable effect upon the properties of polyesters, polyurethanes, polycarbonates, and modified condensation polymers of these general types. These condensation polymers include some of the highest melting aliphatic polyesters ever reported. For example, the polycarbonates of aliphatic glycols described in the prior art generally melt in the vicinity of 100° C. or less whereas polycarbonates of the spiro-glycols of this invention can be produced which melt at 260–270° C. It appears that the spiro-glycol containing two gem-dialkyl groups in accordance with this invention contributes an unexpectedly desirable combination of physical and chemical characteristics which were quite unexpected.

Although this invention in its preferred embodiments is primarily concerned with linear condensation polymers useful for the manufacture of fibers to be used for synthetic fabrics and films which can be used for packaging purposes or for a support for photographic emulsions, this invention also contemplates the lower melting condensation polymers having melting points as low as about 150° C. which can be used as molding or coating compositions or employed in the preparation of such compositions or the like.

It is an object of this invention to provide high melting linear highly polymeric condensation polymers containing recurring units of the type defined above.

It is a more particular object of this invention to provide polyesters and polyurethanes containing such recurring units.

A further object of this invention is to provide a process of preparing polyesters derived from the herein de-fined spiro-glycol which involves the employment of this glycol in conjunction with an aliphatic acylic glycol whereby particularly advantageous results are obtained.

It is a further object of this invention to provide polyesters containing no aromatic constituents which have exceptionally high melting points especially the polycarbonates derived from the spiro-glycol.

It is a further object of this invention to provide polyurethanes having exceptionally high melting points, in particular the polyurethane derived from p,p'-methylene-bis-phenyl isocyanate and the spiro-glycol.

An additional object of this invention is to provide new and useful fibers, fabrics prepared from such fibers, films, coating compositions, molding compositions, photographic film, insulating materials, and other products produced from the polymers of this invention.

Other objects will become apparent elsewhere herein.

According to a preferred embodiment of this invention there is provided a high melting linear highly polymeric polyester comprising recurring structural units having the following formula:

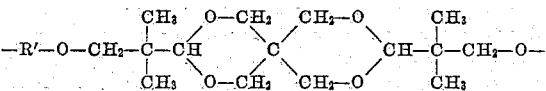

wherein R' represents the non-functional residue of a bifunctional carboxy compound.

In accordance with another advantageous embodiment of this invention there is provided a high melting linear highly polymeric polyurethane comprising recurring structural units having the following formula:

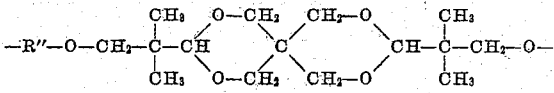

wherein R" represents the non-functional residue of a bifunctional isocyanate compound.

The gem-dialkyl glycol containing a spiro linkage which is employed in accordance with this invention is β,β,β',β'-tetramethyl - 2,4,8,10 - tetraoxaspiro - (5,5) - undecane-3,9-diethanol. This compound will hereinafter be referred to as the spiro-glycol and has the formula shown hereinbelow. This glycol can also be employed as a lower alkanoic ester or half ester thereof in practicing this invention although it is most advantageously employed as the free glycol.

The spiro-glycol employed in accordance with this invention and certain other related spiro-glycols can be prepared by various processes. An especially advantageous process comprises treating hydroxypivaldehyde with pentaerythritol. The reaction of hydroxypivaldehyde with pentaerythritol is represented by the equation:

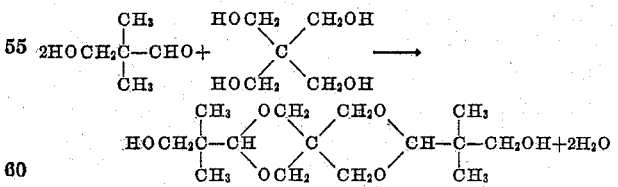

This reaction is a special case of the reaction of hydroxypivaldehyde with various 2-hydroxymethyl-1,3-propanediols which can be represented by the equation:

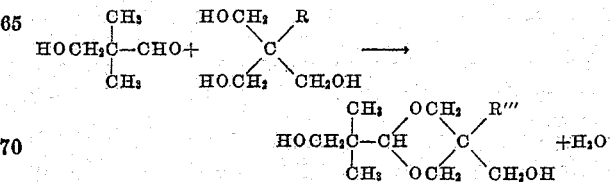

in which R''' represents a hydrogen atom or an alkyl radical. Hydroxypivaldehyde is readily prepared by known methods from isobutyraldehyde and formaldehyde. The polyhydroxy compounds are readily prepared by known methods from formaldehyde and acetaldehyde or an appropriate higher aldehyde. Approximately the theoretical ratio of reactants is used in the reaction. Any strong acid can function as a catalyst, but the preferred catalysts are sulfonic acids such as p-toluenesulfonic acid. It is preferred to use toluene as solvent for the reaction and as a means of removing the water as it is formed, but the toluene can be replaced by another volatile aromatic hydrocarbon such as xylene or other inert solvent capable of removing the water from the reaction mixture by azeotropic distillation. The reaction can be carried out at atmospheric pressure and at the temperature of the refluxing solvent. The products are soluble in most solvents. The products are easily purified by recrystallization from such solvents as toluene, ethylene dichloride, the lower alcohols, and mixtures of the lower alcohols with water.

Examples of how such glycols can be advantageously prepared are as follows:

Example A 102 g. hydroxypivaldehyde, 68 g. pentaerythritol, 400 ml. toluene, and 2 g. p-toluenesulfonic acid hydrate were combined and stirred while boiling under reflux. Water was collected in a phase-separating head at the top of a short packed column. Heating and stirring were continued as long as water collected (about 2.5 hours). The product separated on cooling and was recrystallized successively from toluene, 1:1 (by volume) water-isopropyl alcohol, and ethylene dichloride. A yield of $\beta,\beta,\beta',\beta'$ - tetramethyl - 2-4,8,10 - tetraoxaspiro (5,5)-undecane-3,9-diethanol of about 80% of theory was obtained. Melting point 197° C.; carbon found 59.17%, calculated 59.21%; hydrogen found 9.19%, calculated 9.21%.

Example B 75 g. 2-hydroxymethyl-2-ethyl-1,3-propanediol, 57.2 g. hydroxypivaldehyde, 300 ml. toluene, and 2 g. p-toluenesulfonic acid hydrate were combined, and the reaction was carried out as in Example A. The product was recrystallized from ethylene dichloride and from water containing a little isopropyl alcohol. A yield of 5-hydroxymethyl-5-ethyl-$\beta,\beta$-dimethyl-2-m-dioxane ethanol of about 85% of theory is obtained. Melting point 123° C.; carbon found 60.48%, calculated 60.55%; hydrogen found 10.11%, calculated 10.09%.

Example C

Starting with 2-hydroxymethyl-1,3-propanediol and 2-hydroxymethyl-2-methyl-1,3-propanediol and following the procedure of Example B 5-hydroxymethyl-$\beta,\beta$-dimethyl-2-m-dioxane ethanol and 5-hydroxymethyl-$\beta,\beta,5$-trimethyl-2-m-dioxane ethanol respectively were also prepared.

Although the spiro-glycol prepared as in Example A is the only compound of this general type contemplated for employment in accordance with the invention described herein, it is obvious that other glycols described in the above examples can be used in minor quantities to produce modified condensation polymers or to produce condensation polymers having some value in the manufacture of molding compositions, coating compositions and the like. Other related spiro-glycols which do not contain the gem-dialkyl structures in $\beta$-relationship to the glycolic oxygen atoms have been described in an abandoned application 316,079 filed October 21, 1952 by Elam and Hasek. These related spiro-glycols can also be used in preparing useful modified condensation polymers.

The preparation of the condensation polymers of this invention does not necessarily involve any process techniques which differ significantly from the processes well known in the art for the preparation of polyesters and polyurethanes. There are numerous patents in the prior art thoroughly discussing all the ramifications of how to prepare such condensation polymers as well as modified condensation polymers of the same general type.

Thus, the polyesters of this invention can be advantageously produced by heating the spiro-glycol with an ester of a suitable dibasic acid in the presence of a suitably catalyst under conditions that will produce a high molecular weight polyester employing either the melt polymerization technique or the solid phase polymerization technique. The products produced have melting points of 150° C. and higher. In some cases the polyesters melt as high as 250° C. or higher. The polycarbonate is of particular value because it melts at 250–270° C. and is crystalline. The polyesters of this invention exhibit the property of cold drawing and can be converted into strong elastic fibers by the usual melt spinning and drafting procedures. The polyesters of this invention are also valuable as molding plastics and can be fabricated by the usual injection and extrusion processes. The polyesters are also of value as photographic film base materials. Moreover, the polyesters of this invention can be employed in coating compositions and for various other purposes known to those familiar with the art.

Examples of bifunctional carboxy compounds which can be employed in the preparation of the polyesters of this invention include the following acids or esters thereof: succinic acid, 2-methyladipic acid, sebacic acid, azelaic acid, 3-ethylsebacic acid, glutaric acid, adipic acid, dimethylmalonic acid, p-carboxycarbanilic acid, terephthalic acid, trans hexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenoxy)ethane, 4,4'-dicarboxydiphenyl ether, 1,4-naphthalenedicarboxylic acid, 1,5-naphthalenedicarboxylic acid, $\alpha,\alpha$-dimethyladipic acid, dicarboxydiethyl ether, isophthalic acid, etc. It is apparent that any of the aromatic, partially or completely hydrogenated aromatic, aliphatic, or other types of bifunctional carboxy compounds (acids, esters, acid chlorides, etc.) can be employed in preparing the polyesters of this invention. This includes the employment of mixtures of any of these compounds and can include the presence of hydroxy substituted bifunctional carboxy compounds such as hydroxypivalic acid, p-hydroxyethylbenzoic acid, etc. This can also include the employment of an amino substituted bifunctional carboxy compound such as 6-aminohexanoic acid, p-aminoethylbenzoic acid, etc. Similarly, bifunctional carboxy compounds which can be employed include those containing one carboxy substituent and one isocyanate substituent such as those compounds which are analogous to the other bifunctional compounds already mentioned. The bifunctional carboxy compounds which can be employed in accordance with this invention also include acids which contain sulfur or oxygen linkages as illustrated by diglycolic acid, 4,4'-oxydibutyric acid, and the sulfur analogs of these acids.

In preparing polycarbonates in accordance with this invention, it is preferred to employ a substantial excess of a lower dialkyl ester of carbonic acid in proportion to the spiro-glycol because these carbonic esters are quite volatile and are more readily eliminated during the polymerization condensation reaction than are many of the other bifunctional carboxy compounds.

The polyesters of this invention contemplate the preparation of the polymer from a bifunctional glycol reactant or mixture of reactants which contains at least 10 mole percent of the spiro-glycol defined above. Most advantageously, at least 50% of the spiro-glycol is present as the bifunctional glycol reactant.

A more particular embodiment of this invention provides a process for preparing a high melting linear highly polymeric polyester comprising condensing one mole proportion of a bifunctional carboxy compound containing from 1 to 20 carbon atoms with from about 1.2 to about 2.2 mole proportions of a mixture of glycols consisting of from about 0.5 to about 1.0 mole proportion of a spiroglycol having the following formula:

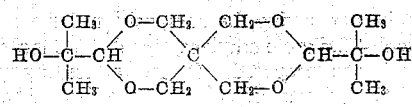

and from 50 to about 200 mole percent (based on the moles of the spiro-glycol) of an aliphatic acylic glycol containing from 1 to 6 carbon atoms.

By practicing this particular process, the aliphatic acyclic glycol which is employed in a fairly substantial proportion is largely lost during the course of the condensation reaction since it is relatively quite volatile in comparison to the spiro-glycol. Thus, the polyester produced contains in the molecular structure substantially more than the initial ratio of the spiro-glycol residues in proportion to the acyclic glycol residues.

Examples of modifying bifunctional hydroxy compounds which can be employed in accordance with this invention in conjunction with the spiro-glycol include the straight chain polymethylene glycols containing from 2 to 12 carbon atoms such as ethylene glycol, tetramethylene glycol, pentamethylene glycol, hexamethylene glycol, decamethylene glycol, etc., branched chain aliphatic glycols such as 2-ethyl-tetramethylene glycol, 2,2-dimethyl-1,3-propanediol, etc., trans-quinitol, either cis or trans-1,4-cyclohexanedimethanol, amino alcohols such as 6-aminohexanol, 2-ethyl-4-aminobutanol, etc., hydroxy substituted bifunctional carboxy compounds as mentioned hereinabove, hydroxy-substituted bifunctional isocyanates, and other compounds known in the art which contain hydroxy substituents and can be employed in the preparation of linear condensation polymers.

A particularly advantageous group of bifunctional hydroxy compounds is the acyclic aliphatic glycol group containing from 1 to 6 carbon atoms which are relatively quite volatile compared to the spiro-glycol and which contribute to an especially advantageous result when employed in accordance with the especially advantageous process described hereinabove. Thus, under the condition of polymerization in accordance with this particularly advantageous process, most of the spiro-glycol will remain in the polymer while the volatile aliphatic acyclic glycol will distill out to a large extent. The resulting copolyester will then contain a minor amount of residues derived from the latter glycol in the polymer chain. By following this special process to produce these particular products, it has been unexpectedly ascertained that the use of the relatively volatile glycol, along with the spiro-glycol, materially increases the rate of build-up during the polymerization reaction thereby producing an especially advantageous group of polyesters in an unexpectedly short period of time. These products have unusually high molecular weights, are unusually stable, have excellent color and other desirable physical and chemical characteristics.

In general, any of the known catalysts employed for conducting polyesterification condensation reactions can be employed. A large number of these are described in the prior art and the techniques involved in employing these catalysts are well known. Generally, from about 0.005% up to about 0.1% of such a catalyst can be employed based on the weight of the reactants being condensed. Examples of some of these catalysts are set forth in the working examples presented hereinbelow.

In the working examples given below, the first stage of the reaction is carried out at a temperature of 180–230° C. and at atmospheric pressure, in order to distill the alcohol formed by the ester interchange and produce low-molecular-weight glycol esters. It is important to exclude oxygen and moisture at all stages of the reaction. The temperature is then raised to 240–300° C. depending upon the melting point of the polyester. Some of the excess glycol is distilled at this stage. The final phase of the reaction is carried out under vacuum and with good agitation in order to facilitate the escape of volatile products from the highly viscous melt. Alternatively, the polymer may be made by the solid-phase process. When this method is used, a prepolymer having a viscosity of 0.15 to 0.30 is made by stirring the melted polymer in vacuum as described above. This prepolymer is then removed from the vessel and pulverized to a particle size of 0.01–0.03 inch. The pulverized prepolymer is then heated in vacuum or in an inert gas stream at 200–260° C.

This embodiment of the invention can be further illustrated by the following examples of preferred embodiments although it is to be understood that these examples are merely for purpose of illustration and are not intended to limit the scope of the invention unless otherwise indicated.

*Example 1.—Polyester from a succinate*

Three hundred and ninety-five g. (1.3 moles) of the spiroglycol and 174 g. (1.0 mole) of diethyl succinate were placed in a reaction vessel equipped with a stirrer, a distillation column, and an inlet for purified nitrogen. A solution of 0.2 g. sodium titanium ethoxide in 2 cc. of ethyl alcohol was added as catalyst and the mixture was stirred at 210–220° C. in a stream of nitrogen. Ethyl alcohol was distilled from the vessel until about 1.6 moles was collected. The temperature was then raised to 250–260° C. and held for 30 minutes. A vacuum of 0.1 mm. was applied and stirring was continued for 3–4 hours. A colorless, high viscosity melt was obtained. The polyester melted in the range of 190°–210° C. It was soluble in tetrachloroethane and in trichloroethane. Films were cast from these solvents. Fibers were spun by extruding the melted polymer through a multi-hole spinneret. After the fibers had been drafted and heat set, they were strong and elastic and were used in the preparation of valuable textile fabrics. Films were made by extruding the melted polymer through a die with an opening of 0.020 inch. The films were drafted 250% in each direction at an elevated temperature. The drafted films were clear, flexible, and strong. They were useful as photographic film base materials. The polyester was also useful as a molding plastic. It could be processed by the usual injection, compression, and extrusion equipment.

*Example 2.—Polyester from an adipate modified with tetramethylene glycol*

Two hundred and seventy-four grams (0.9 mole) of the spiroglycol, 45 g. (0.5 mole) of tetramethylene glycol, and 174 g. (1.0 mole) of dimethyl adipate were placed in a reaction vessel as described in Example 1. A solution of 0.1 g. magnesium titanium butoxide in 2 cc. of butyl alcohol was added as catalyst. The mixture was then heated and stirred as described in Example 1. A high viscosity product was obtained. Analysis showed that the polyester contained about 0.8 mole of the spiroglycol and 0.2 mole of tetramethylene glycol. This polyester melted in the range of 150–165° C. and was useful as a molding plastic and was also formed into sheets useful as wrapping materials.

*Example 3.—Polyester from a carbonate*

Three hundred and four grams (1.0 mole) of the spiro-glycol and 472 g. (4.0 moles) of diethyl carbonate were placed in a reaction vessel as described in Example 1. A solution of 0.3 g. sodium ethoxide in 10 cc. of ethyl alcohol was added as catalyst and the mixture was stirred at reflux temperature. Ethyl alcohol was distilled through the column until about 1.8 moles had been removed. The temperature was then raised until the reaction mixture had reached 180–200° C. in order to remove the excess diethyl carbonate. A solution of 0.3 g. titanium butoxide in 5 cc. of butyl alcohol was then added, as polymerization catalyst, and the temperature was raised to 270–280° C. A vacuum of 0.05 mm. was applied and stirring was continued for 1 hour. A product with a very high melt viscosity was obtained. The polyester was crystalline and melted at 260–270° C. This is an unusually high melting point for an aliphatic polyester. The polymer was useful for the manufacture of films, fibers, and molded objects. It is soluble in tetrachloroethane.

*Example 4.—Polyester from a carbonate modified with tetramethylene glycol*

A mixture of 0.85 mole of the spiro-glycol and 0.15 mole tetramethylene glycol was reacted with excess diethyl carbonate as described in Example 3. The copolyester melted at 245–255° C. and was useful for the manufacture of fibers, films, and molded objects.

*Example 5.—Polyester from a carbonate modified with hexamethylene glycol*

A mixture of 0.80 mole of the spiro-glycol and 0.20 mole hexamethylene glycol was reacted with excess diethyl carbonate to give a copolyester melting at 230–240° C.

*Example 6.—Polyester from a carbonate*

The spiro-glycol was reacted with excess diethyl carbonate as described in Example 3. The polymerization conditions were the same up to the vacuum stage. A vacuum of 0.05 mm. was applied at 230° C. until the reaction mixture solidified. A prepolymer was formed under these conditions which had a viscosity of 0.15. The prepolymer was removed from the flask and pulverized to a particle size of 0.01–0.03 inch. The prepolymer powder was then heated at 240° C. with agitation in a vacuum of 0.05 mm. for 3 hours. A higher viscosity polymer was obtained using this technique since the melt viscosity becomes so high in melt polymerization that the reaction mixture can no longer be stirred. This polymer was formed into useful fibers and films. The films were useful as supports for photographic emulsions.

*Example 7.—Polyester from a terephthalate modified with tetramethylene glycol*

Two hundred and twelve grams (0.7 mole) of the spiroglycol, 54 g. (0.6 mole) of tetramethylene glycol, and 194 g. (1.0 mole) of dimethyl terephthalate were placed in a reaction vessel as described in Example 1. A solution of 0.2 g. sodium titanium butoxide in 5 cc. of butyl alcohol was added as catalyst. The mixture was then heated and stirred as described in Example 1. In the final stage of polymerization, vacuum was applied at 275° C. for a period of 2 hours. A clear, colorless polymer was a very high melt viscosity was obtained. The polymer melted at 238–270° C. It was valuable in the production of films and fibers. Due to the crystalline nature of the polymer, these products were especially suitable to be drafted and heat-set to give films and fibers with very good physical properties. The films could either be extruded or cast from a solvent such as tetrachloroethane.

*Example 8.—Polyester from a terephthalate and pentamethylene glycol*

Pentamethylene glycol was used in equimolar proportion in place of tetramethylene glycol in Example 7. This copolyester melted at 215–240° C. and was useful for the manufacture of fibers, films, and molded objects.

*Example 9.—Polyester from a terephthalate and ethylene glycol*

Ethylene glycol was used in equimolar proportion in place of tetramethylene glycol in Example 7. The copolyester was less crystalline and had a lower melting point than those in the preceding two examples. It was useful as a molding plastic.

*Example 10.—Polyester from a terephthalate and ethylene glycol*

A copolyester having the composition 0.4 mole of the spiro-glycol +0.6 mole ethylene glycol +1.0 mole terephthalic acid was prepared. It had a melting point of 180–220° C. and was difficult to crystallize. These characteristics made it valuable as a molding plastic.

*Example 11.—Polyester from sulfonyldibenzoic acid modified with tetramethylene glycol*

A copolyester having the composition 0.4 mole of the spiro-glycol +0.6 mole tetramethylene glycol +1.0 mole 4,4'-sulfonyldibenzoic acid was prepared. This polymer melted at 245–270° C. and was useful in the manufacture of fibres, films, and molded objects.

In a sense, the polyurethanes produced in accordance with this invention are reaction products of a functional derivative of a bifunctional carboxy compound wherein there is a nitrogen atom in alpha relationship to each carboxy group. The compounds employed in accordance with this embodiment of the invention for preparing the polyurethanes are bifunctional isocyanate compounds which have at least one —N=C=O group which after condensation becomes an

group.

Thus, it is apparent that the polyurethanes of this invention are analogous in many respects to the polyesters described hereinabove.

Generally speaking, the polyurethanes of this invention do not melt at as high temperatures as the polyesters containing no urethane linkages. However, the polyurethanes of this invention are valuable in the preparation of sheets, wrapping materials, molding compositions, coating compositions, expanded cellular compositions, fibrous compositions, etc.

Some of the polyurethanes of this invention are particularly advantageous in the preparation of high melting linear highly polymeric polyurethanes which can be formed into fibers useful in preparing textiles and films for photographic emulsion supports. These particularly advantageous embodiments of the invention are produced by employing a bifunctional isocyanate having the following formula:

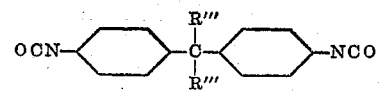

wherein R''' represents a member selected from the group consisting of a hydrogen atom and an alkyl radical (preferably containing no more than 4 carbon atoms). Of course, other analogous compounds can be similarly employed. The most advantageous polyurethanes are produced when R''' is an H atom.

The usual processes for preparing any of the polyurethanes of this invention are well known in the art and need not be described in detail in this application. Although this invention contemplates all polyurethanes employing the spiro-glycol described above, it is most particularly concerned with the linear polyurethanes last defined hereinabove.

In accordance with one particularly advantageous process for preparing the polyurethanes of this invention, approximately equal molar quantities of very pure reactants are used, the chain length of the ultimate polymer being determined by the purity and exact ratio of reactants in accordance with well-known principles pertaining to the preparation of such polyurethanes. Any liquid which is inert toward both of the reactants and which is a solvent for both can be advantageously used as a solvent medium during the course of the reaction. The preferred solvents are those which are also solvents for the polymer. Of course, as is well known in the art, the condensation can also be carried out in the absence of a solvent. The reaction mixture is normally heated to a preferred temperature range of from 75° to about 160° C. although higher or lower temperatures can also be employed. The polyurethanes of this invention are generally soluble in dimethylformamide and most of them are also soluble in formic acid and various lactones. When such polyurethanes are prepared in accordance with the preferred procedures employing a solvent which dissolves the reactants as well as the polyurethane, the polyurethane produced may be separated in a purified form by precipitation from the reaction mixture with water or a lower alcohol.

The reaction to form polyurethanes is given by the equations $$(n+1)HO-X-OH + nOCN-Z-NCO \longrightarrow$$
$$HO-X-(OCONH-Z-NHCOO-X-)_nOH$$

or $$nHO-X-OH + (n+1)OCN-Z-NCO \longrightarrow$$
$$OCN-Z-(NHCOO-X-OCONH-Z-)_nNCO$$

in which HO—X—OH reperesents the spiro-glycol described above and —Z— reperesents any of a variety of alkylene, arylene, or aralkylene structures including $-(CH_2)_m-$, and structures with phenylene rings (including $-C_6H_4-CH_3$, $-C_6H_4-CH_2-C_6H_4-$)

and $-C_6H_4-O-C_2H_4-O-C_6H_4-$ wherein n and m are integers.

This embodiment of the invention can be further illustrated by the following examples of preferred embodiments although it is to be understood that these examples are merely for purpose of illustration and are not intended to limit the scope of the invention unless otherwise indicated.

*Example 12.—Polyurethane from p,p'-methylene-bis-phenylisocyanate*

To a solution of 6.08 g. of the spiro-glycol in 70 ml. of 1,4-dioxane was added 20.00 ml. of a 1.000 M solution of p,p'-methylene-bis-phenylisocyanate in 1,4-dioxane. The solution was vigorously stirred during and for 2 or 3 minutes after the addition of the diisocyanate solution. The mixture was then heated at 90° for 12 hours. Throughout the course of the reaction moisture was rigidly excluded. The polymer precipitated from the solution as it formed and was filtered, washed with dioxane, and dried. The polymer was fiber-forming, melts at 250° C., and is soluble in dimethylformamide. It formed excellent fibers and films and was made into useful fabrics and a support for photographic emulsion.

*Example 13.—Polyurethane from toluene-2,4-diisocyanate*

To a solution of the spiro-glycol in 85 ml. 1,4-dioxane was added 20 ml. of a 1.250 M solution of tolylene-2,4-diisocyanate. The procedure was otherwise the same as that of Example 12. The polymer was fiber-forming, melts at 145° C., and is soluble in dimethylformamide, lactones, and carboxylic acids. It was especially useful in molding compositions.

*Example 14.—Polyurethane from hexamethylene diisocyanate*

The procedure of Example 12 was followed using an equimolar proportion of hexamethylene diisocyanate. The polymer precipitated only when cooled. The polymer melts at 170–175° C., and is soluble in dimethylformamide and in carboxylic acids.

*Example 15.—Modified polyurethane*

The procedure of Example 12 was followed using 6.54 g. of 5-hydroxymethyl-β,β-dimethyl-5-ethyl-2-m-dioxane ethanol and 6.08 g. of the spiro-glycol in 120 ml. of 1,4-dioxane and 50 ml. of the diisocyanate solution. The polymer melts at 230–240° C., and is soluble in dimethylformamide. A valuable polyurethane could also be produced by the process of this example omitting the spiroglycol.

*Example 16.—Polyurethane from decamethylene diisocyanate*

A 20% solution of the spiro-glycol was prepared in nitrobenzene. A 50% solution of decamethylene diisocyanate was prepared in nitrobenzene. The solutions were heated to 100° C. and were then mixed in a ratio it give exactly equivalent molar amounts of the spiroglycol and the diisocyanate. The mixture was then heated to 140–150° C. and stirred for 30 minutes. The polymer was isolated by pouring the reaction mixture into isopropyl alcohol. The polymer melted at 155–160° C. It was useful as a molding plastic.

It is believed that the above description of the preparation of the highly polymeric linear condensation polymers contemplated by this invention which are produced by the condensation of the spiro-glycol defined hereinabove is more than adequate to enable those persons skilled in the art to practice this invention and that the numerous modifications which can be practiced will be quite obvious to such persons. Thus, any of the known bifunctional carboxy compounds, bifunctional hydroxy compounds, and bifunctional isocyanate compounds which are useful in the preparation of such condensation polymers can be employed in accordance with this invention. Numerous examples of such compounds have been presented hereinabove and can be employed in accordance with the working examples or employing other techniques equivalent thereto.

Although the invention has been described in considerable detail with reference to certain preferred embodiments thereof, it will be understood that certain modifications can be effected without departing from the scope of the invention as described hereinabove as defined in the appended claims.

We claim:

1. A high melting linear highly polymeric condensation polymer of (A) at least one bifunctional compound selected from the group consisting of carbonic acid, a dicarboxylic acid containing from 2 to 20 carbon atoms and an organic diisocyanate containing from 6 to 23 carbon atoms and (B) at least one bifunctional glycol composed of from 50 to 100 mole percent of a spiro glycol having the following formula:

$$HO-CH_2-\underset{CH_3}{\overset{CH_3}{C}}-\underset{O-CH_2}{\overset{O-CH_2}{C}}C\underset{CH_2-O}{\overset{CH_2-O}{C}}CH-\underset{CH_3}{\overset{CH_3}{C}}-CH_2-OH$$

and from 0 to 50 mole percent of an aliphatic glycol having from 2 to 12 carbon atoms, the relative proportions of (A) and (B) constituents being such as to constitute a polymer selected from the group consisting of polyesters and polyurethanes, which polymer melts at between about 150° C. and about 270° C.

2. A polymer as defined by claim 1 which is a polyester.

3. A polyester as defined by claim 2 wherein (A) is succinic acid.

4. A polyester as defined by claim 2 wherein (A) is adipic acid.

5. A polyester as defined by claim 2 wherein (A) is carbonic acid.

6. A polyester as defined by claim 2 wherein (A) is terephthalic acid.

7. A polyester as defined by claim 2 wherein (A) is 4,4′-sulfonyldibenzoic acid.

8. A polyester as defined by claim 2 wherein (B) is composed of a substantial proportion up to 50 mole percent of said glycol having from 2 to 12 carbon atoms.

9. A polyester as defined by claim 8 wherein (B) is composed of a substantial proportion of tetramethylene glycol.

10. A polyester as defined by claim 8 wherein (B) is composed of a substantial proportion of pentamethylene glycol.

11. A polyester as defined by claim 8 wherein (B) is composed of a substantial proportion of hexamethylene glycol.

12. A polyester as defined by claim 8 wherein (B) is composed of a substantial proportion of ethylene glycol.

13. A polyester as defined by claim 8 wherein (B) is composed of a substantial proportion of 2,2-dimethyl-1,3-propanediol.

14. A polymer as defined by claim 1 which is a polyurethane.

15. A polyurethane as defined by claim 14 wherein (A) is a diisocyanate having the formula

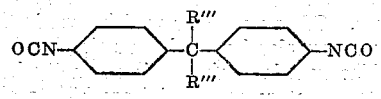

wherein each R′′′ represents a member selected from the group consisting of a hydrogen atom and an alkyl radical having from 1 to 4 carbon atoms.

16. A polyurethane as defined by claim 15 wherein each R′′′ is a hydrogen atom.

References Cited in the file of this patent

UNITED STATES PATENTS

| | | |
|---|---|---|
| 2,389,662 | Fisher et al. | Nov. 27, 1945 |
| 2,525,681 | Rochdale et al. | Oct. 10, 1950 |

FOREIGN PATENTS

| | | |
|---|---|---|
| 838,827 | Germany | May 12, 1952 |

OTHER REFERENCES

Schulz et al.: Angewandte Chemie 62, #5, p. 105–118.